United States Patent [19]

Luebke

[11] Patent Number: 5,137,495
[45] Date of Patent: Aug. 11, 1992

[54] SHAFT COUPLING ALLOWING FOR AN OFFSET OF AXES

[75] Inventor: Herbert Luebke, Lienen, Fed. Rep. of Germany

[73] Assignee: Windmoeller & Hoelscher, Lengerich/Westf., Fed. Rep. of Germany

[21] Appl. No.: 507,837

[22] Filed: Apr. 12, 1990

[30] Foreign Application Priority Data

Apr. 13, 1989 [DE] Fed. Rep. of Germany ....... 3912201

[51] Int. Cl.⁵ .............................................. F16D 3/04
[52] U.S. Cl. ................................... 464/102; 464/182; 464/901; 403/261
[58] Field of Search ................. 464/102, 901, 182, 69; 403/261, 260, 166

[56] References Cited

U.S. PATENT DOCUMENTS

| | | | |
|---|---|---|---|
| 1,021,247 | 3/1912 | Goersch | 464/102 X |
| 1,251,065 | 12/1917 | McCain | 403/260 |
| 2,845,781 | 8/1988 | O'Brien | 464/156 |
| 2,894,779 | 7/1959 | Kushner et al. | 403/166 X |
| 3,664,153 | 5/1972 | Sugahara | 464/69 |
| 4,033,144 | 7/1977 | Allen | 464/69 |
| 4,484,899 | 11/1984 | Haarmann | 464/69 |

FOREIGN PATENT DOCUMENTS

| | | |
|---|---|---|
| 3628982 | 3/1988 | Fed. Rep. of Germany . |
| 2331712 | 6/1977 | France . |
| 2398556 | 2/1979 | France . |
| 2022774 | 12/1979 | United Kingdom . |
| 2116669 | 9/1983 | United Kingdom . |

Primary Examiner—Daniel P. Stodola
Assistant Examiner—Tony A. Gayoso
Attorney, Agent, or Firm—Fleit, Jacobson, Cohn, Price, Holman & Stern

[57] ABSTRACT

A shaft coupling allowing for an offset of axes comprises radially displaceable members and preferably serves to couple a journal of a printing cylinder to a drive shaft and comprises positively interengaging coupling parts, which are connected to the respective shafts to be coupled, and an assembly for forcing said coupling parts against each other. A radially displaceable outer coupling disk of the shaft coupling is connected to a member which is formed with a central bore, an axially displaceable bolt extends into and is centered in said bore and when the shaft coupling is disengaged said bolt will be urged by a spring into a central bore or aperture of the drive shaft or of a member which is connected to the drive shaft.

6 Claims, 2 Drawing Sheets

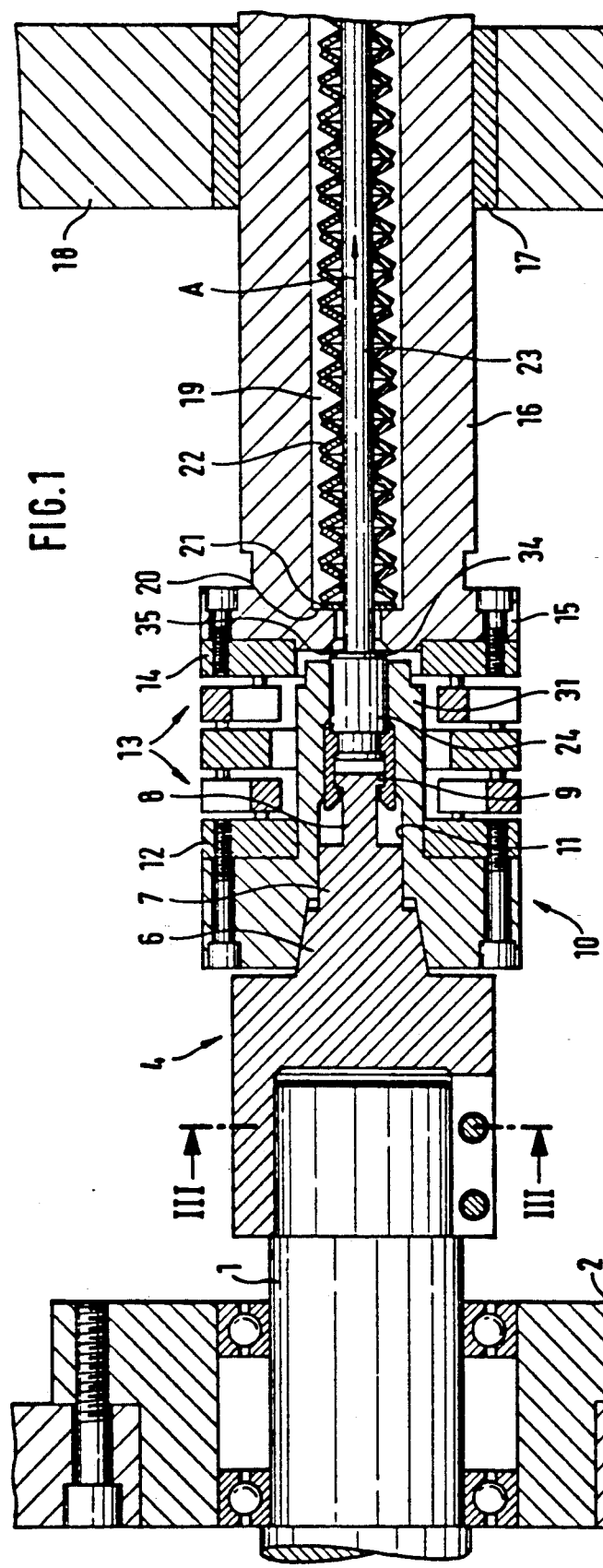
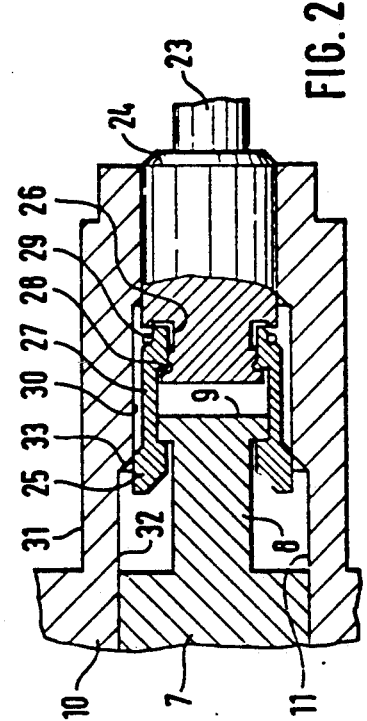
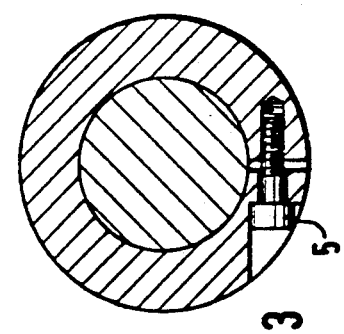

SHAFT COUPLING ALLOWING FOR AN OFFSET OF AXES

BACKGROUND OF THE INVENTION

1. Field of the Invention

This invention relates to a shaft coupling allowing for an offset of axes, which coupling comprises radially displaceable members and preferably serves to couple a journal of a printing cylinder to a drive shaft and comprises positively interengaging coupling parts, which are connected to the respective shafts to be coupled, and means for forcing said coupling parts against each other.

2. Description of the Prior Art

Couplings of that kind are used when an offset of the axes of the shafts which are to be coupled cannot be avoided. In multicolor printing presses the printing cylinders of the several printing units are driven by drive shafts and each drive shaft is connected to a journal of a printing cylinder by a shaft coupling, which allows for an offset of the axes of the drive shaft and of the journal of the printing cylinder because that offset of the axes can never entirely be avoided. Such couplings are known in the form of so-called Oldham couplings. For instance, a six-color printing press may be used to print with only four rather than six colors. In that case the two printing cylinders which are not required for the printing operation are uncoupled from the associated drives but the associated drive shafts provided with the coupling parts which are mounted thereon and allow for an offset of axes are still operated. When the coupling part which allows for an offset of the associated printing cylinder the radially displaceable members of that coupling part will undesirably be radially outwardly displaced so that an undesired rotary unbalance will occur and will result not only in substantial loads on the bearings for the drive shaft but also in an unsteady operation of the printing press.

SUMMARY OF THE INVENTION

For this reason it is an object of the invention to provide a shaft coupling which is of the kind described first hereinbefore and in which a rotary unbalance will not occur even when the coupling has been disengaged and the coupling part which allows for an offset of axes continues to rotate together with the drive shaft.

In a shaft coupling of the kind described first hereinbefore that object is accomplished in that a radially displaceable outer coupling disk of the shaft coupling is connected to a member which is formed with a central bore, an axially displaceable bolt extends into and is centered in said bore and when the shaft coupling is disengaged said bolt will be urged by a spring into a central bore or aperture of the drive shaft or of a member which is connected to the drive shaft. When the shaft coupling according to the invention is disengaged, the outer coupling disk of the coupling part which allows for an offset of axes will be centered on the drive shaft by the axially displaceable bolt so that the radially displaceable members of that coupling part cannot move radially outwardly and cannot result in rotary unbalance. As a result a printing cylinder of an individual printing unit of a multicolor printing press can be uncoupled from the associated drive shaft and in that case a continued rotation imported by the drive shaft to the coupling part which for an offset of axes will not result in rotary unbalance.

The centered bolt suitably consists of a drawhead, which carries gripping jaws of a collect and is connected to a rod, which is guided in an axial bore of the drive shaft and is biased by a spring, which urges the drawhead to a centered position on the drive shaft. On that side which faces the drive shaft the drawhead may be provided with a frustoconical shoulder, which in that position in which the shoulder is centered on the drive shaft extends into a complementary hollow-conical countersink formed at the rim of the bore in the drive shaft.

In accordance with a further feature of the invention the member which is connected to the outer coupling disk is formed with an aperture which is trapezoidal in cross-section and which receives and interlocks with a complementary portion of coupling part provided on the driven shaft, and said complementary portion is provided with an extension, which is gripped by the gripping jaws. By the gripping jaws the interlocking coupling parts are forced against each other so that an effective and backlash-free coupling of the shafts to be coupled will be ensured.

The extension suitably comprises a portion which is coupled in the bore of that member which is connected to the outer coupling disk.

The rod may extend through a compression spring, which bears at one end on an annular shoulder, which defines a smaller-diameter bore portion near the coupling side end of the central bore of the drive shaft, and said spring bears at its other end on an enlarged head at the end of the rod. As a result, the compression always urges the rod in the direction in which the bolt which is constituted by the drawhead engages the drive shaft for effecting a centering. When it is desired to loosen the grip, the rod must be moved against the force of the spring so that the gripping jaws are disengaged from the output part of the coupling.

That member which is connected to the outer coupling disk suitably consists of a central tubular member, which at its end is provided with a laterally enlarged flange, that is enlarged in width. The centering bore is formed in the tubular member.

BRIEF DESCRIPTION OF THE DRAWING

FIG. 1 is a longitudinal sectional view showing a coupling, by which a drive shaft is coupled to a journal of a printing cylinder and which allows for an offset of the axes.

FIG. 2 shows the middle region of the coupling shown in FIG. 1 with the gripping jaws for connecting the parts of the coupling.

FIG. 3 is a sectional view taken on line III—III in FIG. 1.

DETAILED DESCRIPTION OF THE PREFERRED EMBODIMENT

Figure 4:
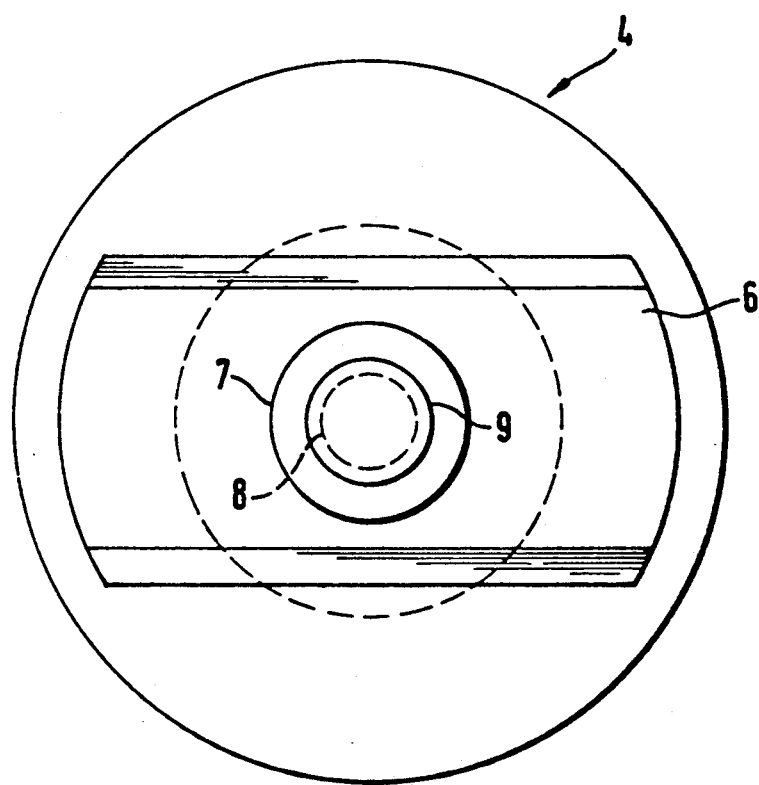
FIG. 4 is an end view showing the left-hand part of the coupling of FIG. 1 when it has been uncoupled.

An illustrative embodiment of the invention will now be described more in detail with reference to the drawing.

FIG. 1 shows a journal 1 of a printing cylinder of a multicolor printing press. That printing cylinder is not shown in more detail. The journal 1 is connected by a flange bearing 2 to the side wall of an inking roller carriage, which is of a usual type and is not shown in more detail. A coupling part 4 is mounted on the journal 1 at that end thereof which protrudes to the right from the flange bearing. By means of a clamp screw 5 the coupling part 4 is secured to the journal 1 of the printing cylinder. The coupling part 4 is shown in a top plan view in FIG. 4 to comprise a coupling extension 6, which is trapezoidal in cross-section and is succeeded by a cylindrical guide pin 7. The guide pin 7 comprises a cylindrical extension 8, which is provided at its free end with an outwardly protruding flange 9. The coupling extension 6 which is trapezoidal in cross-section protrudes into a mating recess formed in a receiving head 10. The cylindrical guide pin 7 is guided in a bore 11 of the receiving head. A second coupling part generally designed 13 allows for an offset of axes and comprises an outer coupling disk 12, which is screw-connected to the receiving head 10. The other outer disk 14 of the coupling part 13 is fixedly screw-connected to a revolving outer mounting ring 15, which constitutes a part of the drive shaft 16. By means of a sliding surface bearing 17 the drive shaft 17 is rotatably and axially slidably mounted in a side wall 18 of a printing press. In addition to the outer mounting ring 15 the drive shaft 16 comprises an axial bore 19, which has a portion that is smaller in diameter in the left-hand end portion of the shaft 16 so that a shoulder 20 is provided in that region of the bore 19. A compression spring 22 bears on said shoulder 20 with a washer 21 interposed. The compression spring 22 surrounds a rod 23, which is provided with a flange, which is not shown and on which the spring 22 abuts at that end which is remote from the washer 21. As a result, the spring 22 always urges the rod 23 in the direction which is indicated by the arrow A so that the drawhead 24 which is connected to the left-hand end of the rod 23, by means of the gripping jaws 25 firmly pulls the coupling part 4 against the receiving head 10.

The collet comprising the gripping jaws 25 will be only briefly described because it is of known type. The drawhead 24 is formed with an annular groove 26, in which the legs 27 of the gripping jaws 25 are pivoted on pivot pins 28. The legs 27 are surrounded at their free ends by a spring ring 29 and are forced by that spring ring 29 into the groove 26 so that the gripping jaws 25 are always biased outwardly. In the embodiment shown on the drawing, an outward movement of the gripping jaws is prevented because the gripping jaws are guided in a bore 30, which closely surrounds the gripping jaws. The bore 30 is formed in the cylindrical extension 31 of the receiving head 10 and is succeeded toward the journal 1 by a bore 32, which is larger in diameter. When the rod 23 is forced to the left against the force of the spring 22, opposite to the direction indicated by the arrow A, the gripping jaws 25 will swing outwardly as they slide on the beveled surface 33 and will engage the inside surface of the bore 32, which is larger in diameter than the bore 30. The shaft 16 is subsequently displaced to the right by means which are not shown so that the coupling part 4 and the receiving head 10 are no longer operatively connected. The spring 22 is then relieved from pressure so that the spring 22 moves the rod 23 in the direction indicated by the arrow A. As a result, the inclined annular surface 34 of the drawhead 24 engages the beveled surface 35 of the extension so that the drawhead 24 is centered on the shaft 16. As is clearly apparent from FIG. 2 the cylindrical extension 31 of the receiving head 10 firmly encloses the drawhead 24 and that receiving head is also centered on the shaft 16 as well as the outer coupling disk 12 of the coupling part 13 so that the outer coupling disk 12 can no longer be displaced to an eccentric position relative to the shaft 16.

I claim:

1. A coupling device for coupling a drive shaft member to a driven shaft member comprising a receiving head for releasably receiving a coupling part on the driven shaft member and providing a rotary drive connection with said coupling part, a coupling assembly including radially movable coupling members connected between the receiving head and the drive shaft member, said coupling members comprising means for rotatably coupling the receiving head and the drive shaft member and means for allowing an offset of the axes of the receiving head and the drive shaft member, the drive shaft member being formed with an axial bore, a bolt received in said bore with radial clearance, a head portion formed on the bolt extending into the receiving head, the bolt being axially movable in the drive shaft member between a coupling position and an uncoupling position, the head portion in the coupling position of the bolt extending beyond an outer end of said bore to allow radial movement of the bolt, the head portion and the receiving head relative to the drive shaft member thereby accommodating said offset of axes, the head portion in the uncoupling position of the bolt engaging the outer end of said bore to prevent radial movement of the bolt, the head portion and the receiving head relative to the drive shaft member, thereby maintaining the receiving head in substantially coaxial alignment with the drive shaft member.

2. A device as claimed in claim 1 wherein the drive shaft member includes spring means within said bore urging the bolt toward the uncoupling position.

3. A device as claimed in claim 2 wherein the head portion of the bolt is formed with a collet having gripping jaws for releasably gripping an end portion of said coupling part.

4. A device as claimed in claim 1 wherein the outer end of the bore is bevelled and the head portion of the bolt has a corresponding bevel to engage therewith in the uncoupling position of the bolt.

5. A device as claimed in claim 1 wherein the receiving head and the coupling part have complimentary interfitting male and female portions of non-circular cross-section for providing said rotary drive connection.

6. A device as claimed in claim 1 wherein the coupling part is secured to a printing cylinder of a printing machine.

* * * * *